S. F. SWANTEES.
WARMING CLOSET.
APPLICATION FILED JAN. 24, 1913.
1,112,491.
Patented Oct. 6, 1914.
2 SHEETS—SHEET 2.
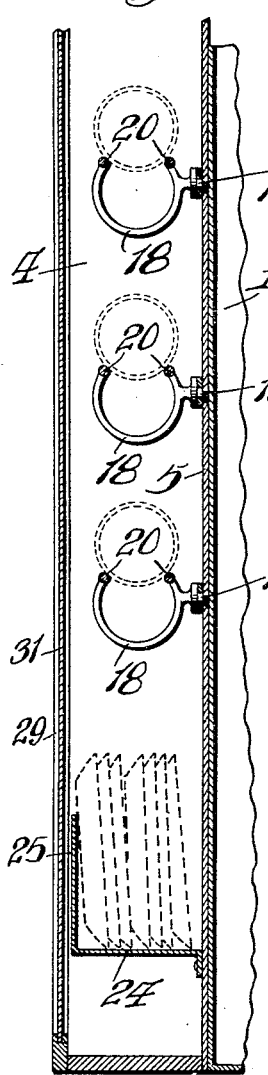
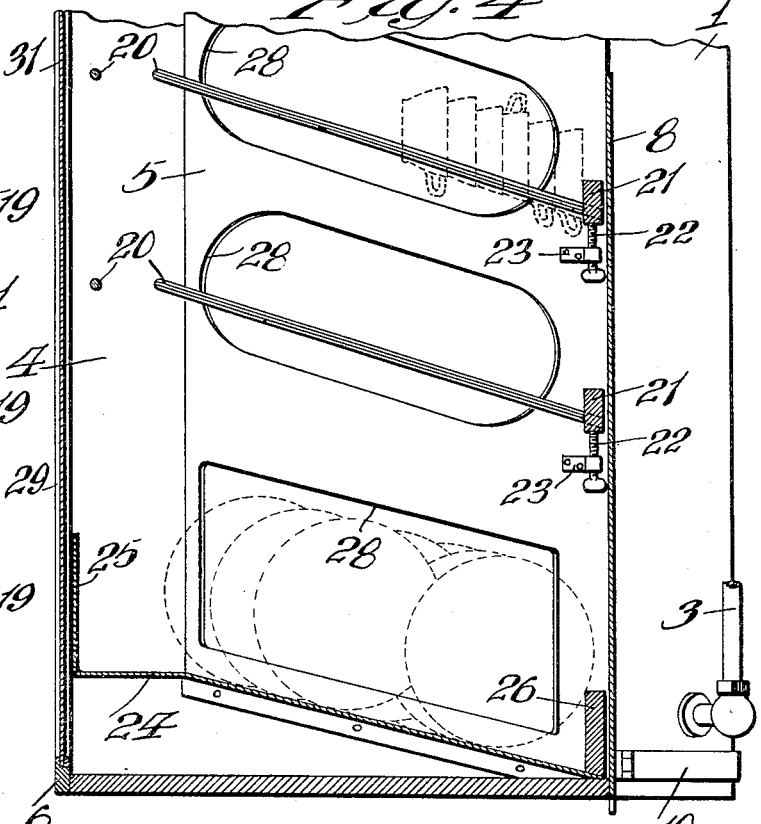
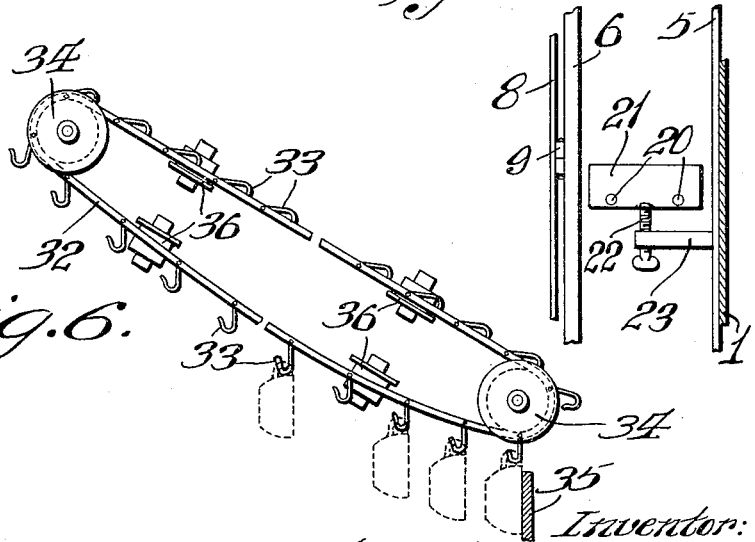
Inventor:
Samuel F. Swantees.
By Knight Bros. attys.

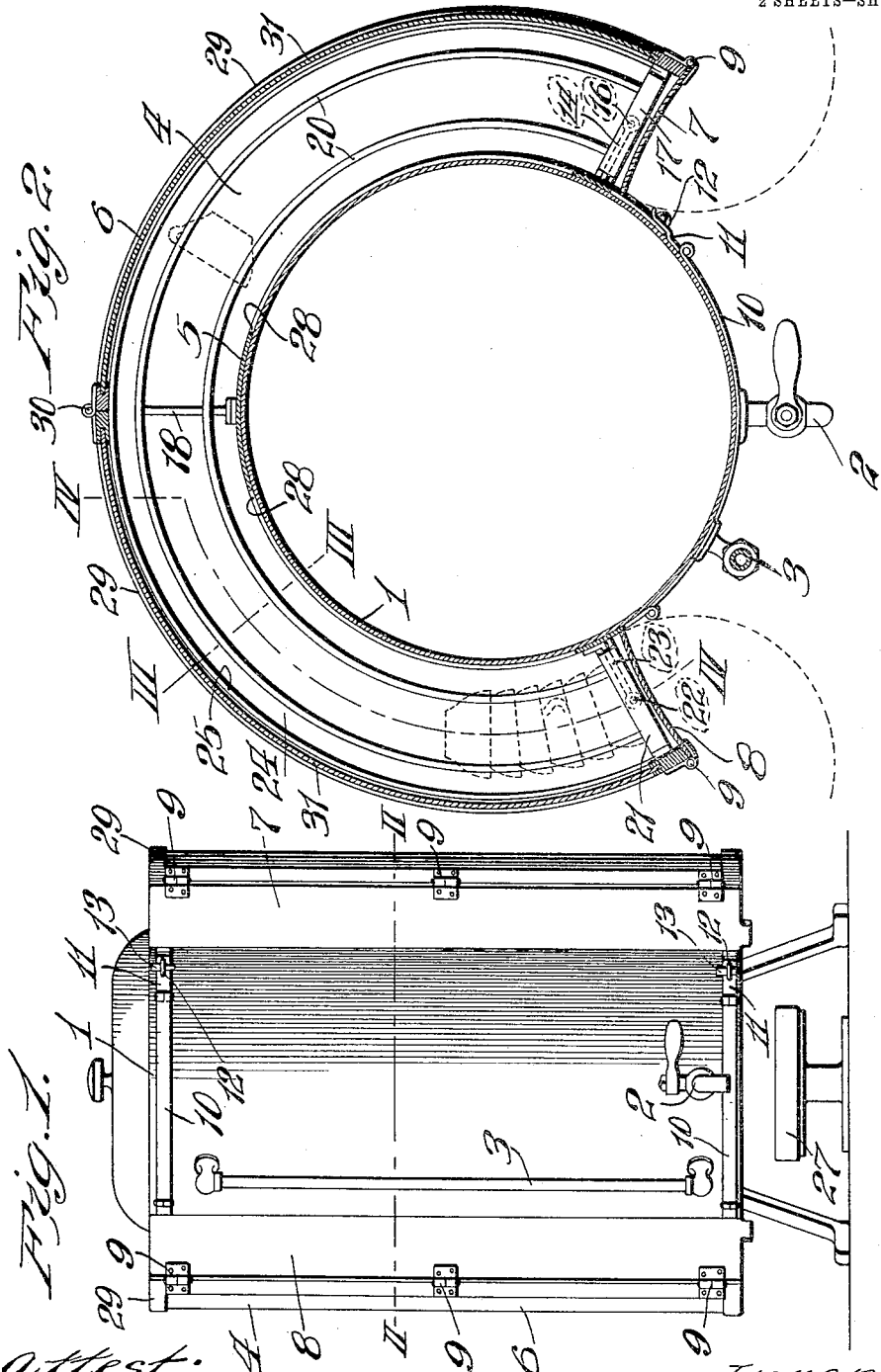

UNITED STATES PATENT OFFICE.

SAMUEL F. SWANTEES, OF ST. LOUIS, MISSOURI.

WARMING-CLOSET.

1,112,491.  Specification of Letters Patent.  Patented Oct. 6, 1914.

Application filed January 24, 1913. Serial No. 743,891.

*To all whom it may concern:*

Be it known that I, SAMUEL F. SWANTEES, a citizen of the United States of America, residing in the city of St. Louis and State of Missouri, have invented certain new and useful Improvements in Warming-Closets, of which the following is a specification.

The primary object of this invention is to provide a warming closet adjacent a heated vessel so that serving dishes are made warm, and are handy to the server.

Another object is to provide a warming closet adjacent a heated vessel containing foodstuffs, whereby the dishes are warmed and handled in turn in the order in which they are put into the warming closet.

A further object is to provide a warming closet whereby the dishes are fed in at one side and taken out at the other side, which will insure the warming of the dishes.

Other and further objects will appear in the specification and be specifically pointed out in the appended claims, reference being had to the accompanying drawings exemplifying the invention, and in which, Figure 1 is a side elevation of a coffee urn, showing this improved warming closet mounted adjacent the side walls of the urn. Fig. 2 is an enlarged horizontal section taken on the line II—II, Fig. 1. Fig. 3 is an enlarged vertical section taken on the line III—III, Fig. 2. Fig. 4 is a vertical section taken on the line IV—IV, Fig. 2. Fig. 5 is an enlarged fragmentary end elevation of this improved warming closet, showing the door opening, one of the side walls of the urn being shown in section. Fig. 6 shows another embodiment of a cup conveyer which might be used in this improved warming closet.

Referring to the drawings: 1 designates a coffee urn which has the usual discharge faucet 2, and gage-glass 3. Located adjacent the side walls of said urn is a warming closet 4, said warming closet having an inner wall 5 and an outside wall 6. The end walls thereof consist preferably of an inlet door 7, and outlet door 8, said doors having hinges 9 which are mounted to the side walls 6. In order to securely mount the warming closet 4 to the urn 1, hinge straps 10 are used, which straps have the hinged tongues 11 which engage the staples 12 and are secured thereto by pins, or other fastenings, 13. Mounted on the inner wall 5, adjacent the door 7, are brackets 14, which brackets have an interiorly threaded portion 15. Engaging said threaded portions are adjusting screws 16. Mounted on said adjusting screws 16 are end blocks 17. Mounted on the inner wall 5, and at the rear thereof, are a series of track supporting brackets 18, which brackets are mounted one above another and are oscillatably mounted to the inner wall 5, as shown at 19. Securely mounted to said brackets 18 are a pair of track-ways 20. Said trackways are mounted at one end to the end blocks 17, and at the other end to end blocks 21, said end blocks 21 being adjacent the outlet door 8. Each of said end blocks 21 is mounted on an adjusting screw 22, said adjusting screws being mounted in brackets 23 which are supported by the inner wall 5. These trackways 20 are circular to conform to the coffee urn 1, and are inclined downwardly from the inlet door 7 to the outlet door 8, so that when dishes, such as cups, are put in at the inlet door end of the closet 4, said cups will slide by gravity down the trackways 20 until the dishes abut against the end blocks 21. If the inclination of the trackways 20 is not just right for the proper sliding action of the cups, the inclination of said trackways can be adjusted by manipulating the adjusting screws 16 and 22. Located adjacent the bottom of the closet 4 is an inclined chute 24 which is mounted to the inner wall 5, said chute having an up-turned side wall 25. This chute 24 is for the reception of plates or saucers which, when put in endwise through the inlet door 7, will roll down said chute until they abut the end block 26. As shown, this coffee urn is heated by the burner 27, and this improved warming closet 4 being mounted adjacent the walls of said coffee urn will be heated therefrom. In order to give greater radiation of heat from said coffee urn, openings such as 28 are formed in the inner wall 5. Said openings are preferably located adjacent the path of travel of the dishes.

It is readily seen how, when cups are put in through the inlet door 7, they will engage the trackways 20 and after abutting against the end blocks 21 will stack together and will become warm. When it is desired to fill a cup with coffee, one of the cups abutting the end block 21, can be taken out and the other cups will slide down until the next cup abuts said end block 21. When plates or saucers are taken from the warming closet adjacent the end block 26, the dishes that are left in the closet will simultaneously roll down to said end block 26. It is thus seen how dishes are put in through the inlet door 7 and gravitate to a point adjacent the outlet door where they are handy to the server, and are kept warm. Also, by reason of this improved warming closet, the dishes are kept in a sanitary condition.

As shown in the drawings, the outside wall 6 is composed of a pair of circular doors 29, which are hinged together at 30, said doors having panes of glass 31 so that the sanitary condition of this improved warming closet can be readily inspected and opened to be cleaned.

In the embodiment shown in Fig. 6, which shows another form of conveyer which can be readily mounted in this improved warming closet, the chain belt 32 has hooks 33. Said chain belt is mounted over groove pulleys 34, one of the pulleys being mounted on a plane higher than the other. When cups are mounted on said hooks on the slack side of said chain belt, said cups will travel downwardly until they abut against the end block 35. When a conveyer of this kind is used in a circular closet, said chain 32 will be guided by a guide pulley such as 36.

What I claim is:

1. The combination of a dish-warming closet and a heated vessel, and means whereby dishes are conveyed from a high point on one end of said closet to a lower point at the other end of said closet.

2. The combination of a warming closet and a heated vessel, conveyers located in said closet, said conveyers forming means for conveying dishes from a high point on one end to a lower point at the other end of said closet.

3. The combination of a warming closet and a heated vessel, said vessel being adapted to contain foodstuff, said closet being located against the outside of said vessel, and means located in said closet for passing dishes therethrough, said vessel adapted to heat said closet.

4. The combination of a warming closet and a heated vessel, said closet being adapted to be heated by said vessel, gravity conveyers located in said closet, said conveyers forming means for conveying dishes through said closet.

5. A heated dispensing vessel, a closet located adjacent said vessel, said closet having a receiving and a delivery end for dishes, means located in said closet for moving dishes from a high point on one end to a lower point at the other end of said closet, said closet adapted to be heated by said vessel.

6. The combination of a warming closet and a heated vessel, said closet being adapted to be heated by said vessel, inclined trackways located in said closet, said inclined trackways forming means for conveying dishes from one end to the other of said closet.

7. The combination of a dish warming closet and a heated vessel, said closet being located adjacent said vessel and adapted to be heated thereby, a receiving end and a delivery end formed in said closet, and a conveyer located in said closet adapted to carry dishes to a lower plane at the delivery end of said closet from the receiving end thereof.

SAMUEL F. SWANTEES.

In the presence of—
M. C. HAMMON,
H. G. FLETCHER.

Copies of this patent may be obtained for five cents each, by addressing the "Commissioner of Patents, Washington, D. C."